(12) United States Patent
Zhamu et al.

(10) Patent No.: US 8,132,746 B2
(45) Date of Patent: Mar. 13, 2012

(54) LOW-TEMPERATURE METHOD OF PRODUCING NANO-SCALED GRAPHENE PLATELETS AND THEIR NANOCOMPOSITES

(75) Inventors: Aruna Zhamu, Centerville, OH (US);
Jinjun Shi, Columbus, OH (US);
Jiusheng Guo, Centerville, OH (US);
Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 204 days.

(21) Appl. No.: 11/787,442

(22) Filed: Apr. 17, 2007

(65) Prior Publication Data
US 2008/0258359 A1    Oct. 23, 2008

(51) Int. Cl.
B02C 19/00    (2006.01)
(52) U.S. Cl. ............................... 241/1; 241/23
(58) Field of Classification Search .............. 252/378 R; 423/448; 241/1, 5, 23, 65
See application file for complete search history.

(56) References Cited

U.S. PATENT DOCUMENTS

| | | |
|---|---|---|
| 2,798,878 A | 7/1957 | Hummers |
| 3,434,917 A | 3/1969 | Kraus et al. |
| 3,885,007 A | 5/1975 | Olsen et al. |
| 4,091,083 A | 5/1978 | Hirschvogel et al. |
| 4,244,934 A | 1/1981 | Kondo et al. |
| 4,895,713 A | 1/1990 | Greinke et al. |
| 5,503,717 A | 4/1996 | Kang |
| 5,698,088 A | 12/1997 | Kang |
| 6,287,694 B1 | 9/2001 | Zaleski et al. |
| 6,872,330 B2 | 3/2005 | Mack et al. |
| 7,071,258 B1 | 7/2006 | Jang et al. |

OTHER PUBLICATIONS

U.S. Appl. No. 10/858,814, filed Jun. 3, 2004, Jang, et al.
J. J. Mack, et al., "Graphite Nanoplatelet Reinforcement of Electrospun Polyacrylonitrile Nano-fibers," Adv. Materials, 7 (2005) Jan. 6, pp. 77-80.
Novoselov, K. S., et al. "Electric field effect in atomically thin carbon films,", Science, 306 (2004) 666-669.
C. Lee, X. Wei, J. W. Kysar, & J. Hone, Measurement of Elastic Properties and Intrinsic Strength of Monolayer Graphene, Science, 321, Jul. 2008, 385-388.
A. Balandin, S. Ghosh, W. Bao, I. Calizo, D. Teweldebrhan, F. Miao, and C. N. Lau, "Superior Thermal Conductivity of Single-Layer Graphene," Nano Lett., 8 (3), 2008, 902-907.
Geim, A. K. & Novoselov, K. S. "The rise of graphene," Nature Materials 6, 183-191 (2007).

*Primary Examiner* — Mark Rosenbaum

(57) ABSTRACT

A method of exfoliating a layered material to produce separated nano-scaled platelets having a thickness smaller than 100 nm. The method comprises: (a) providing a graphite intercalation compound comprising a layered graphite containing expandable species residing in an interlayer space of the layered graphite; (b) exposing the graphite intercalation compound to an exfoliation temperature lower than 650° C. for a duration of time sufficient to at least partially exfoliate the layered graphite without incurring a significant level of oxidation; and (c) subjecting the at least partially exfoliated graphite to a mechanical shearing treatment to produce separated platelets. The method can further include a step of dispersing the platelets in a polymer or monomer solution or suspension as a precursor step to nanocomposite fabrication.

21 Claims, 1 Drawing Sheet ved to be a method of
LOW-TEMPERATURE METHOD OF PRODUCING NANO-SCALED GRAPHENE PLATELETS AND THEIR NANOCOMPOSITES This invention is based on the research result of a US Department of Energy (DoE) Small Business Innovation Research (SBIR) project. The US government has certain rights on this invention.

FIELD OF THE INVENTION

The present invention relates generally to a method of producing nano-scaled plate-like or sheet-like structures and their nanocomposites and, particularly, to nano-scaled graphene platelets (NGPs), graphite oxide platelets, and graphite fluoride platelets and nano-scaled platelet-reinforced nanocomposites.

BACKGROUND

Carbon is known to have four unique crystalline structures, including diamond, graphite, fullerene and carbon nano-tubes. The carbon nano-tube (CNT) refers to a tubular structure grown with a single wall or multi-wall, which can be conceptually obtained by rolling up a graphene sheet or several graphene sheets to form a concentric hollow structure. A graphene sheet is composed of carbon atoms occupying a two-dimensional hexagonal lattice. Carbon nano-tubes have a diameter on the order of a few nanometers to a few hundred nanometers. Carbon nano-tubes can function as either a conductor or a semiconductor, depending on the rolled shape and the diameter of the tubes. Its longitudinal, hollow structure imparts unique mechanical, electrical and chemical properties to the material. Carbon nano-tubes are believed to have great potential for use in field emission devices, hydrogen fuel storage, rechargeable battery electrodes, and as composite reinforcements.

However, CNTs are extremely expensive due to the low yield and low production rates commonly associated with all of the current CNT preparation processes. The high material costs have significantly hindered the widespread application of CNTs. Rather than trying to discover much lower-cost processes for nano-tubes, we have worked diligently to develop alternative nano-scaled carbon materials that exhibit comparable properties, but can be produced in larger quantities and at much lower costs. This development work has led to the discovery of processes for producing individual nano-scaled graphite planes (individual graphene sheets) and stacks of multiple nano-scaled graphene sheets, which are collectively called "nano-scaled graphene plates (NGPs)." NGPs could provide unique opportunities for solid state scientists to study the structures and properties of nano carbon materials. The structures of these materials may be best visualized by making a longitudinal scission on the single-wall or multi-wall of a nano-tube along its tube axis direction and then flattening up the resulting sheet or plate. Studies on the structure-property relationship in isolated NGPs could provide insight into the properties of a fullerene structure or nano-tube. Furthermore, these nano materials could potentially become cost-effective substitutes for carbon nano-tubes or other types of nano-rods for various scientific and engineering applications.

Direct synthesis of the NGP material had not been possible, although the material had been conceptually conceived and theoretically predicted to be capable of exhibiting many novel and useful properties. Jang and Huang have provided an indirect synthesis approach for preparing NGPs and related materials [B. Z. Jang and W. C. Huang, "Nano-scaled Graphene Plates," U.S. Pat. No. 7,071,258 (Jul. 4, 2006)]. Another process developed by B. Z. Jang, et al. ["Process for Producing Nano-scaled Graphene Plates," U.S. patent pending, Ser. No. 10/858,814 (Jun. 3, 2004)] involves (1) providing a graphite powder containing fine graphite particles (particulates, short fiber segments, carbon whisker, graphitic nano-fibers, or combinations thereof) preferably with at least one dimension smaller than 1 µm); (2) exfoliating the graphite crystallites in these particles in such a manner that at least two graphene planes are either partially or fully separated from each other, and (3) mechanical attrition (e.g., ball milling) of the exfoliated particles to become nano-scaled to obtain NGPs. The starting powder type and size, exfoliation conditions (e.g., intercalation chemical type and concentration, temperature cycles, and the mechanical attrition conditions (e.g., ball milling time and intensity) can be varied to generate, by design, various NGP materials with a wide range of graphene plate thickness, width and length values. Ball milling is known to be an effective process for mass-producing ultra-fine powder particles. The processing ease and the wide property ranges that can be achieved with NGP materials make them promising candidates for many important industrial applications. The electronic, thermal and mechanical properties of NGP materials are expected to be comparable to those of carbon nano-tubes; but NGP will be available at much lower costs and in larger quantities.

In this and other prior art methods for making separated graphene platelets, the process begins with intercalating lamellar graphite flake particles with an expandable intercalation agent (intercalant), followed by expanding the intercalant to exfoliate the flake particles. Conventional intercalation methods and recent attempts to produce exfoliated products or separated platelets are given in the following representative references:

1. J. W. Kraus, et al., "Preparation of Vermiculite Paper," U.S. Pat. No. 3,434,917 (Mar. 25, 1969).
2. L. C. Olsen, et al., "Process for Expanding Pyrolytic Graphite," U.S. Pat. No. 3,885,007 (May 20, 1975).
3. A. Hirschvogel, et al., "Method for the Production of Graphite-Hydrogensulfate," U.S. Pat. No. 4,091,083 (May 23, 1978).
4. T. Kondo, et al., "Process for Producing Flexible Graphite Product," U.S. Pat. No. 4,244,934 (Jan. 13, 1981).
5. R. A. Greinke, et al., "Intercalation of Graphite," U.S. Pat. No. 4,895,713 (Jan. 23, 1990).
6. F. Kang, "Method of Manufacturing Flexible Graphite," U.S. Pat. No. 5,503,717 (Apr. 2, 1996).
7. F. Kang, "Formic Acid-Graphite Intercalation Compound," U.S. Pat. No. 5,698,088 (Dec. 16, 1997).
8. P. L. Zaleski, et al. "Method for Expanding Lamellar Forms of Graphite and Resultant Product," U.S. Pat. No. 6,287,694 (Sep. 11, 2001).
9. J. J. Mack, et al., "Chemical Manufacture of Nanostructured Materials," U.S. Pat. No. 6,872,330 (Mar. 29, 2005).

However, these previously invented methods had a serious drawback. Typically, exfoliation of the acid-intercalated graphite occurred at a temperature in the range of 800° C. to 1,050° C. At such a high temperature, graphite could undergo severe oxidation, resulting in the formation of graphite oxide, which has much lower electrical and thermal conductivities compared with un-oxidized graphite. In our recent studies, we have surprisingly observed that the differences in electrical conductivity between oxidized and non-oxidized graphite could be as high as several orders of magnitude. It may be noted that the approach proposed by Mack, et al. [e.g., Ref. 9, U.S. Pat. No. 6,872,330 and J. J. Mack, et al., "Graphite Nanoplatelet Reinforcement of Electrospun Polyacrylonitrile Nano-fibers," Adv. Materials, 7 (2005) Jan. 6, pp. 77-80] is also a low temperature process. However, it involves intercalating graphite with potassium melt, which must be carefully conducted in vacuum or extremely dry glove box environment since pure alkali metals like potassium and sodium are extremely sensitive to moisture and pose an explosion danger. This process is not amenable to mass production of nano-scaled platelets.

It is therefore an object of the present invention to provide a method of exfoliating a laminar (layered) compound or element, such as graphite, graphite oxide (partially oxidized graphite), and graphite fluoride without involving a high exfoliation temperature.

It is another object of the present invention to provide a convenient method of exfoliating a laminar material to produce nano-scaled platelets (platelets with a thickness smaller than 100 nm and mostly smaller than 10 nm).

Another object of the present invention is to provide an effective and safe method of mass-producing nano-scaled platelets.

It is still another object of the present invention to provide a method of producing nano-scaled platelets that can be readily dispersed in a liquid to form a nanocomposite structure.

SUMMARY OF THE INVENTION

The present invention provides a method of exfoliating a layered material (e.g., graphite and graphite oxide) to produce nano-scaled platelets having a thickness smaller than 100 nm, typically smaller than 10 nm. The method comprises: (a) providing a graphite intercalation compound comprising a layered graphite containing expandable species residing in an interlayer space of the layered graphite; (b) exposing the graphite intercalation compound to an exfoliation temperature lower than 650° C. for a duration of time sufficient to at least partially exfoliate the layered graphite without incurring a significant level of oxidation; and (c) subjecting the at least partially exfoliated graphite to a mechanical shearing treatment to produce the separated platelets.

The mechanical shearing treatment comprises air milling, ball milling, mechanical attrition, rotating-blade shearing, and/or ultrasonication to further separate the platelets and/or reduce the size of the platelets. For graphite flakes, the resulting graphene platelets typically contain one to thirty layers of graphite planes or graphene sheets with each layer of approximately 0.34 nm (3.4 Å) thick. For graphite oxide flakes, each layer or sheet is approximately 0.64 nm to 1.02 nm in thickness (depending upon the degree of oxidation), but more typically close to 0.74 nm.

The layered graphite material could be natural graphite, synthetic graphite, highly oriented pyrolytic graphite, graphite oxide, graphite fluoride, graphite or carbon fiber, graphite or carbon nano-fiber, or a combination thereof.

Certain nano-scaled platelets (e.g., graphite oxides) are hydrophilic in nature and, therefore, can be readily dispersed in selected solvents (e.g., water). Hence, the invented method can include an additional step of dispersing the platelets in a liquid to form a suspension or in a monomer- or polymer-containing solvent to form a nanocomposite precursor suspension. This suspension can be converted to a mat or paper (e.g., by following a paper-making process). The nanocomposite precursor suspension may be converted to a nanocomposite solid by removing the solvent or polymerizing the monomer. Alternatively, the platelets may be mixed with a monomer or polymer to form a mixture, which can be converted to obtain a nanocomposite solid. In the case of graphite oxide or graphite fluoride platelets, the method may further include a step of partially or totally reducing the graphite oxide or fluoride (after the formation of the suspension) to become graphite (serving to recover at least partially the high conductivity that a pristine graphite would have).

DETAILED DESCRIPTION OF PREFERRED EMBODIMENTS

Figure 1:
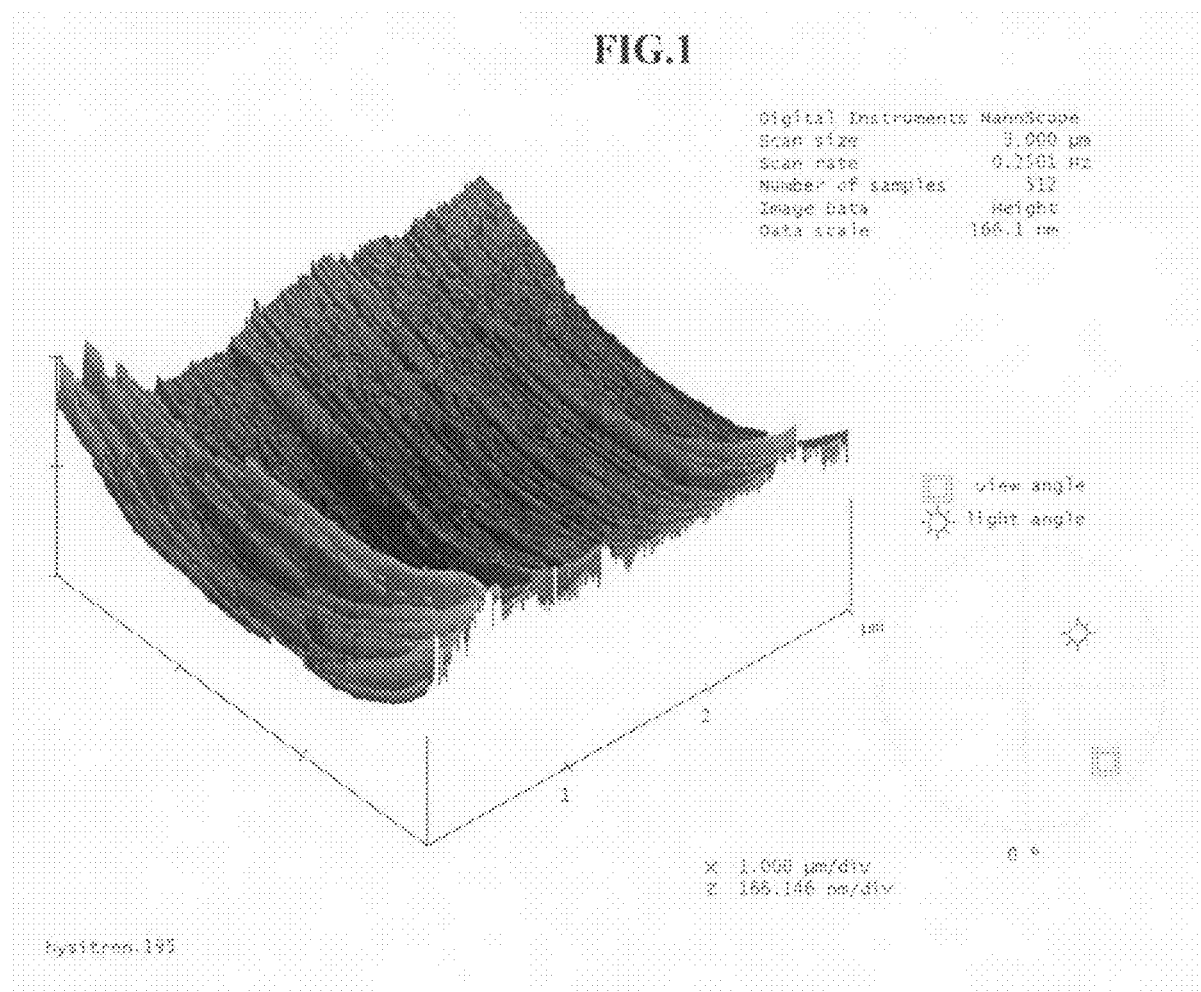
FIG. 1 An atomic force micrograph of partially exfoliated graphite flakes.

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene plates (sheets of graphene planes or basal planes) that are bonded together through van der Waals forces in the c-direction, the direction perpendicular to the basal plane. These graphite crystallites are typically micron- or nanometer-sized. The graphite crystallites are dispersed in or connected by crystal defects or an amorphous phase in a graphite particle, which can be a graphite flake, carbon/graphite fiber segment, or carbon/graphite whisker or nano-fiber. In the case of a carbon or graphite fiber segment, the graphene plates may be a part of a characteristic "turbostratic structure."

One preferred specific embodiment of the present invention is a method of producing a nano-scaled graphene plate (NGP) material that is essentially composed of a sheet of graphene plane or multiple sheets of graphene plane stacked and bonded together. Each graphene plane, also referred to as a graphene sheet or basal plane, comprises a two-dimensional hexagonal structure of carbon atoms. Each plate has a length and a width parallel to the graphite plane and a thickness orthogonal to the graphite plane. The thickness of an NGP is 100 nanometers (nm) or smaller and more typically thinner than 10 nm with a single-sheet NGP being as thin as 0.34 nm. The length and width of a NGP are typically between 1 μm and 20 μm, but could be longer or shorter. For certain applications, both length and width are smaller than 1 μm. In addition to graphite, graphite oxide and graphite fluoride are another two of the many examples of laminar or layered materials that can be exfoliated to become nano-scaled platelets.

Generally speaking, a method has been developed for intercalating and exfoliating a layered or laminar material to produce nano-scaled platelets having a thickness smaller than 100 nm. The method comprises an intercalation step, a partial exfoliation step at a relatively low temperature (e.g., <650° C.) to avoid oxidation, and a further exfoliation and separation step.

Using graphite as an example, the first step may involve preparing a laminar material powder containing fine graphite particulates (granules) or flakes, short segments of carbon fiber or graphite fiber, carbon or graphite whiskers, carbon or graphitic nano-fibers, or their mixtures. The length and/or diameter of these graphite particles are preferably less than 0.2 mm (200 μm), further preferably less than 0.01 mm (10 μm). They can be smaller than 1 μm. The graphite particles are known to typically contain micron- and/or nanometer-scaled graphite crystallites with each crystallite being composed of one sheet or several sheets of graphite plane. Preferably, large graphite particles are pulverized, chopped, or milled to become small particles or short fiber segments before being immersed in an intercalation solution. The reduced particle sizes facilitate fast diffusion or migration of intercalating agent into the interstices between graphite planes in graphite crystallites.

Intercalation of graphite is well-known in the art. A wide range of intercalants have been used; e.g., (a) a solution of sulfuric acid or sulfuric-phosphoric acid mixture, and an oxidizing agent such as hydrogen peroxide and nitric acid and (b) mixtures of sulfuric acid, nitric acid, and manganese permanganate at various proportions. Typical intercalation times are between 2 hours and two days.

Conventional exfoliation processes for producing graphite worms from a graphite material normally include exposing a graphite intercalation compound (GIC) to a high temperature environment, most typically between 850 and 1,050° C. These high temperatures were utilized with the purpose of maximizing the expansion of graphite crystallites along the c-axis direction. Unfortunately, graphite is known to be subject to oxidation at 350° C. or higher, and severe oxidation can occur at a temperature higher than 650° C. even just for a short duration of time. Upon oxidation, graphite would suffer from a dramatic loss in electrical and thermal conductivity.

In contrast, the presently invented method makes use of an exfoliation temperature lower than 650° C., preferably lower than 350° C. Hence, this method obviates the need or possibility to expose the layered material to an oxidizing, high-temperature environment. By exfoliating the GIC at a lower temperature, we obtain some degree of exfoliation or irreversible expansion. Even though the expansion ratios achieved at lower temperatures tend to be lower, the expansions tend to be more uniform across the graphite sample, indicating that most of the graphite layers have a more or less equal opportunity of being expanded or exfoliated (FIG. 1). We have further surprisingly found that the resulting expanded graphite, though only considered partially exfoliated, can be readily further exfoliated by using a mechanical shearing treatment at a relatively low temperature (e.g., room temperature), such as ball milling, air milling, rotating-blade shearing, or ultrasonication. This implies that there is no need to involve a high temperature for graphite exfoliation for the purpose of producing nano-scaled platelets, as opposed to the conventional wisdom that higher expansions ratios are better for the production of graphite worms and flexible graphite. Most surprisingly, the fully separated graphite flakes or NGPs obtained by low-temperature exfoliation and ultrasonication have a lower average thickness and narrower thickness distribution compared to those obtained by high-temperature exfoliation and ultrasonication. These are highly desirable features since the total surface areas of platelets are greater with thinner platelets. Many physical, chemical and mechanical properties of platelets are related to their surface-to-volume ratios.

The low-temperature exfoliation step may be carried out by placing the GIC in a furnace at a pre-set temperature, typically from 200° C.-650° C. Optionally, exfoliation may be conducted in a protective gas atmosphere (e.g., nitrogen or argon). At this temperature, the species residing in the interlayer galley of a laminar material (e.g., graphite flakes) appear to be capable of expanding and overcoming weak van der Waal's forces between layers, thereby at least partially delaminating graphene planes in a graphite crystallite. Typically, partial expansion of the particles is accomplished within a duration of from 10 seconds to about 2 minutes, more typically from 20 second to 40 seconds. Instead of furnace heating, microwave or dielectric heating may be used.

The partially exfoliated graphite may be immersed in a liquid medium which is subjected to ultrasonication or rotating-blade shearing for further exfoliation, separation, and size-reduction of graphite platelets. Ultrasonic or shearing energy also enables the resulting platelets to be well dispersed in the liquid medium, producing a homogeneous suspension. One advantage of this route is that further exfoliation and dispersion are achieved in a single step. A monomer, oligomer, or polymer may be added to this suspension to form a suspension that is a precursor to a nanocomposite structure.

A mechanical shearing or attrition treatment could further reduce the particle sizes for producing the desired nano-scaled platelets. With this treatment, either individual graphene planes (one-layer NGPs) or stacks of graphene planes bonded together (multi-layer NGPs) are reduced in thickness, width, and length. In addition to the thickness dimension being nano-scaled, both the length and width of these NGPs could be reduced to smaller than 100 nm in size if so desired. In the thickness direction (or c-axis direction normal to the graphene plane), there may be a small number of graphene planes that are still bonded together through the van der Waal's forces that commonly hold the basal planes together in a natural graphite. Typically, there are less than 30 layers (often less than 5 layers) of graphene planes, each with length and width from smaller than 1 μm to 200 μm.

Attrition can be achieved by pulverization, grinding, ultra-sonication, air milling, ball milling, rotating blade shearing, etc. High-energy planetary ball mills and rotating blade shearing devices (e.g., Cowles) were found to be particularly effective in producing nano-scaled graphene plates. Since ball milling and rotating blade shearing are considered as mass production processes, the presently invented method is capable of producing large quantities of NGP materials cost-effectively. This is in sharp contrast to the production and purification processes of carbon nano-tubes, which are slow and expensive.

The ball milling procedure, when down-sizing the particles, tend to produce free radicals at peripheral edges of graphene planes. These free radicals are inclined to rapidly react with non-carbon elements in the environment. These non-carbon atoms may be selected to produce desirable chemical and electronic properties. Of particular interest is the capability of changing the dispersibility of the resulting nano-scaled platelets in a liquid or matrix material for the purpose of producing nanocomposites. Non-carbon atoms typically include hydrogen, oxygen, nitrogen, sulfur, and combinations thereof.

Once the nano platelets are produced, the platelets may be dispersed in a liquid to form a suspension or in a monomer- or polymer-containing solvent to form a nanocomposite precursor suspension. The process may include a step of converting the suspension to a mat or paper, or converting the nanocomposite precursor suspension to a nanocomposite solid. If the platelets in a suspension comprise graphite oxide or graphite fluoride platelets, the process may further include a step of partially or totally reducing the graphite oxide or fluoride after the formation of the suspension.

Alternatively, the resulting platelets may be mixed with a monomer to form a mixture, which can be polymerized to obtain a nanocomposite solid. The platelets can be mixed with a polymer melt to form a mixture that is subsequently solidified to become a nanocomposite solid.

The following examples serve to provide the best modes of practice for the present invention and should not be construed as limiting the scope of the invention:

EXAMPLE 1

Nano-Scaled Graphene Platelets (NGPs) from Natural Graphite Flakes

One hundred grams of graphite flakes, ground to approximately 20 μm or less in sizes, were immersed in an acid solution (sulfuric acid/nitric acid/manganese permanganate ratio=4:1:0.08) for 20 hours. The resulting graphite intercalation compound (GIC) was repeatedly rinsed in deionized water to obtain an expandable graphite batch.

Subsequently, approximately ⅓ of the expandable graphite was transferred to a furnace pre-set at a temperature of 600° C. for 45 seconds (Sample A) and another ⅓ at 1,050° C. also for 45 seconds (Sample B). Sample A was found to exhibit low expansions of graphite crystallites with an expansion ratio of 10-30. Sample B exhibits an expansion ratio of 45-80. Approximately 0.1 grams each of the two samples were then immersed in an ultrasonication bath containing water as a medium. An ultrasonic energy level of 85 W (Branson S450 Ultrasonicator) was used for further exfoliation, separation, and/or size reduction for a period of 2 hours.

In addition, a small portion of the exfoliated graphite particles (from both Sample A and Sample B) were then ball-milled in a high-energy plenary ball mill machine for 24 hours to produce nano-scaled particles with reduced length and width (Samples C and D).

The dimensions and electrical conductivity values of the fully separated graphite flakes or NGPs of Samples A-D are summarized in Table 1. The electrical conductivity was measured on "flexible graphite" samples that were prepared by stacking graphene platelets and compressing the stacked platelets between two platens in a hydraulic press.

TABLE 1

Dimensions and electrical conductivity of NGPs prepared under different conditions.

| Sample | Average platelet length (μm) | Average platelet thickness (nm) | Platelet thickness distribution (nm) | Electrical conductivity (S/cm) |
|---|---|---|---|---|
| A | 4.5 | 4.5 | 2.3-6.8 | 3,500 |
| B | 4.6 | 12.6 | 2.4-23.5 | 3.8 |
| C | 3.4 | 6.4 | 2.3-10.2 | 3,200 |
| D | 3.3 | 12.8 | 2.4-24.5 | 3.7 |

It is of significance to note that the presently invented approach of utilizing a lower exfoliation temperature followed by a shearing treatment provides NGPs that are thinner and exhibit a more uniform (narrower) thickness distribution. Without a high-temperature exposure (hence, relatively oxidation-free), this new approach also leads to NGPs with a much higher conductivity.

EXAMPLE 2

NGP Nanocomposites

Approximately 5 grams of Sample A was added to 100 mL of water and a 0.2% by weight of a surfactant, sodium dodecylsulfate (SDS) to form a slurry, which was then subjected to ultrasonication at approximately 10° C. for one hour. A stable dispersion (suspension) of well-dispersed nano-scaled graphite platelets was obtained. A water-soluble polymer, polyethylene glycol (1% by weight), was then added to the suspension. Water was later vaporized, resulting in a nanocomposite containing NGPs dispersed in a polymer matrix.

EXAMPLE 3

NGPs from Short Carbon Fiber Segments

The procedure was similar to that used in Sample A of Example 1, but the starting material was carbon fibers chopped into segments with 0.2 mm or smaller in length prior to the acid intercalation treatment. The diameter of carbon fibers was approximately 12 μm. An expansion ratio of 16 was obtained at 350° C. and, after ultrasonication for 4 hours at 85 W, the platelets exhibit an average thickness of 9.8 nm.

EXAMPLE 4

NGPs from Carbon Nano-Fibers (CNFs)

A powder sample of graphitic nano-fibers was prepared by introducing an ethylene gas through a quartz tube pre-set at a temperature of approximately 800° C. Also contained in the tube was a small amount of nano-scaled Cu—Ni powder supported on a crucible to serve as a catalyst, which promoted the decomposition of the hydrocarbon gas and growth of CNFs. Approximately 2.5 grams of CNFs (diameter of 10 to 80 nm) were intercalated with an acid solution (same as in Example 1) at 25° C. for 4 hours. The sample was then heated to approximately 450° C. to effect exfoliation, followed by a mechanical shearing treatment using a rotating-blade device (Cowles). Fine NGPs with an average thickness of 3.5 nm were obtained.

EXAMPLE 5

Microwave Heating

Same as in Example 4, but heating was accomplished by placing the intercalated sample in a microwave oven using a high-power mode for 3-5 minutes. Very uniform exfoliation was obtained. It was difficult to estimate the temperature that the GIC experienced inside a microwave oven, but the maximum temperature should be no higher than 500° C.

EXAMPLE 6

Graphite Oxide Nano Platelets and their Nanocomposites

Graphite oxide was prepared by oxidation of graphite flakes with sulfuric acid, nitrate, and permanganate according to the method of Hummers [U.S. Pat. No. 2,798,878, Jul. 9, 1957]. Upon completion of the reaction, the mixture was poured into deionized water and filtered. The graphite oxide was repeatedly washed in a 5% solution of HCl to remove most of the sulphate ions. The sample was then washed repeatedly with deionized water until the pH of the filtrate was neutral. The slurry was spray-dried and stored in a vacuum oven at 60° C. for 24 hours. The interlayer spacing of the resulting laminar graphite oxide was determined by the Debey-Scherrer X-ray technique to be approximately 0.73 nm (7.3 Å).

Selected samples of graphite oxide (particle sizes of approximately 4.2 μm) were then intercalated in an acid solution (same as in Example 1) at 25° C. for 18 hours. The resulting acid-intercalated graphite oxide was then transferred to a furnace pre-set at 650° C. to allow for partial exfoliation. The partially exfoliated graphite oxide was mixed with water and a surfactant (Triton X-100), followed by an ultrasonic treatment at 85 W for two hours. The resulting nano platelets were well-dispersed in water, forming a stable water dispersion (suspension). Upon removal of water, the nano platelets settled to form an ultra-thin nano-carbon film, mat, or Bucky paper. Depending upon the volume fraction of nano platelets, the film could be as thin as one to ten graphite oxide layers (approximately 0.73 nm to 7.3 nm).

A small amount of water-soluble polymer (e.g., poly vinyl alcohol) was added to the nano platelet-water suspension with the polymer dissolved in water. The resulting nano platelet suspension with polymer-water solution as the dispersing medium was also very stable. Upon removal of water, polymer was precipitated out to form a thin coating on nano platelets. The resulting structure is a graphite oxide reinforced polymer nanocomposite.

A small amount of the nano platelet-water suspension was reduced with hydrazine hydrate at 100° C. for 24 hours. As the reduction process progressed, the brown-colored suspension of graphite oxides turned black, which appeared to become essentially graphite nano platelets or NGPs.

Another attempt was made to carry out the reduction of the graphite oxide nano platelets prepared via the presently invented method. In this case, hydrazine hydrate reduction was conducted in the presence of poly (sodium 4-styrene sulfonate) (PSS with Mw=70,000 g/mole). A stable dispersion was obtained, which led to PSS-coated NGPs upon removal of water. This is another way of producing platelet-based nanocomposites.

It is clear that the presently invented method is also applicable to non-graphite, layered materials. In these cases, the thermal exfoliation temperature is selected in such a manner that it does not induce oxidation or any undesirable chemical reaction. Complete exfoliation and separation are then effected at a further lower temperature using a mechanical shearing treatment. Hence, another preferred embodiment of the present invention is a method of exfoliating a layered material to produce separated nano-scaled platelets having a thickness smaller than 100 nm. The method comprises: (a) providing an intercalated compound comprising a layered material containing expandable species residing in interlayer spaces of the layered material; (b) exposing the intercalated compound to a first exfoliation temperature for a duration of time sufficient to partially exfoliate the layered material without inducing oxidation or a chemical reaction; and (c) subjecting this partially exfoliated material to a mechanical shearing treatment at a second temperature lower than the first temperature to produce separated nano-scaled platelets.

In the aforementioned Example 1, a desired amount of fully separated graphene platelets were stacked and re-compressed to become flexible graphite sheets for the purpose of measuring the relative electrical conductivity of these platelets. However, flexible graphite sheets can be obtained by re-compressing graphite worms after some mechanical shearing treatment. No complete separation of platelets is necessary prior to re-compression. The resulting flexible graphite sheets, having been exposed to no significant oxidation, exhibit an electrical conductivity typically higher than 3,200 S/cm. By contrast, commercially available flexible graphite sheets, normally having experienced a high exfoliation temperature (though possibly under a protective gas atmosphere), exhibit an electrical conductivity typically in the vicinity of 1,100 S/cm.

In conclusion, the presently invented method has many advantages over prior art methods of exfoliating layered materials for producing nano-scaled platelets. Summarized below are some of the more salient features or advantages:

(1) The present method is versatile and applicable to essentially all layered materials including carbon- or graphite-based layered materials.
(2) The method does not involve a high exfoliation temperature (e.g., below 650° C. for graphite-based material) and, hence, avoids undesirable high-temperature chemical reactions (e.g., avoids oxidation of graphite). When ultrasonic energy or other mechanical shearing treatment is used for further exfoliating and separating nano platelets, the process is conducted near room temperature. The resulting NGPs exhibit excellent conductivity.
(3) Partially exfoliated graphite can be conveniently further exfoliated, separated, and dispersed in a liquid medium when ultrasonication or rotating-blade shearing is utilized. This step is applicable to a wide range of liquid media (water, organic solvents, monomers, oligomers, etc.). Further exfoliation and dispersion are essentially combined into one step.
(4) This method is amenable to the preparation of various precursor forms (e.g., suspension, Bucky paper, mat, thin film, and lamina) to nanocomposites.
(5) With this method one can exercise a good control over the dimensions of nano platelets.

The invention claimed is:

1. A method of exfoliating a layered material to produce separated nano-scaled platelets having a thickness smaller than 100 nm, said method comprising:
   a) providing an acid-intercalated graphite compound;
   b) exposing said graphite intercalation compound to an exfoliation temperature lower than 600° C. for a duration of time sufficient to at least partially exfoliate said layered graphite; and
   c) subjecting said at least partially exfoliated graphite to a mechanical shearing treatment to produce said separated nano-scaled platelets.

2. The method of claim 1 wherein said exfoliation temperature is lower than 350° C.

3. The method of claim 1 wherein said mechanical shearing treatment comprises air milling, ball milling, rotating blade shearing, ultrasonication, or a combination thereof.

4. The method of claim 1 wherein said mechanical shearing treatment comprises mixing said at least partially exfoliated graphite in a liquid medium which is subjected to ultrasonication or rotating blade shearing for further exfoliating and separating said graphite to produce the platelets and for dispersing said platelets in said liquid medium.

5. The method of claim 1 wherein said platelets have a thickness smaller than 10 nm.

6. The method of claim 1 wherein said step (b) comprises exfoliating said graphite in a protective gas atmosphere.

7. The method of claim 1 wherein said layered graphite comprises natural graphite, synthetic graphite, highly oriented pyrolytic graphite, graphite oxide, graphite fluoride, graphite or carbon fiber, carbon nano-fiber, or a combination thereof.

8. The method of claim 1 wherein said step (b) comprises placing said graphite intercalation compound in a heated zone of a furnace or subjecting said intercalation compound to microwave or dielectric heating.

9. The method of claim 1 further including a step of dispersing said platelets in a liquid to form a suspension or in a monomer- or polymer-containing liquid medium to form a nanocomposite precursor suspension.

10. The method of claim 9 further including a step of converting said suspension to a mat or paper, or converting said nanocomposite precursor suspension to a nanocomposite solid.

11. The method of claim 1 further including steps of mixing said platelets with a monomer or polymer to form a mixture and converting said mixture to obtain a nanocomposite solid.

12. The method of claim 9 wherein said platelets comprise graphite oxide or graphite fluoride platelets and said method further includes a step of partially or totally reducing said graphite oxide or graphite fluoride after the formation of said suspension.

13. A method of exfoliating a layered material to produce separated nano-scaled platelets having a thickness smaller than 100 nm, said method comprising:
   a) providing an acid-intercalated graphite compound;
   b) exposing said intercalated compound to a first exfoliation temperature for a duration of time sufficient to partially exfoliate said layered material without inducing oxidation or a chemical reaction; and
   c) subjecting said partially exfoliated material to a mechanical shearing treatment at a second temperature lower than the first temperature to produce said separated nano-scaled platelets.

14. The method of claim 13 wherein said mechanical shearing treatment comprises air milling, ball milling, rotating blade shearing, ultrasonication, or a combination thereof.

15. The method of claim 13 wherein said mechanical shearing treatment comprises mixing said partially exfoliated material in a liquid medium which is subjected to ultrasonication or rotating blade shearing for further exfoliating and separating said material to produce the platelets and for dispersing said platelets in said liquid medium.

16. The method of claim 13 further including a step of dispersing said platelets in a liquid to form a suspension or in a monomer- or polymer-containing liquid medium to form a nanocomposite precursor suspension.

17. The method of claim 16 further including a step of converting said suspension to a mat or paper, or converting said nanocomposite precursor suspension to a nanocomposite solid.

18. The method of claim 13 further including steps of mixing said platelets with a monomer or polymer to form a mixture and converting said mixture to obtain a nanocomposite solid.

19. A method of exfoliating a layered material to produce flexible graphite sheets, said method comprising:
   a) providing an acid-intercalated graphite compound;
   b) exposing said graphite intercalation compound to an exfoliation temperature lower than 600° C. for a duration of time sufficient to partially exfoliate said layered graphite;
   c) subjecting said partially exfoliated graphite to a mechanical shearing treatment to further exfoliate said layered graphite; and
   d) re-compressing said further exfoliated graphite to obtain flexible graphite sheets.

20. The method of claim 19 wherein said exfoliation temperature is lower than 350° C.

21. The method of claim 19 wherein said mechanical shearing treatment comprises air milling, ball milling, rotating blade shearing, ultrasonication, or a combination thereof.

* * * * *